Patented Feb. 16, 1943

2,311,508

UNITED STATES PATENT OFFICE 2,311,508

PROCESS FOR TREATING ROSIN

László Auer, South Orange, N. J.

No Drawing. Application June 17, 1942,
Serial No. 447,439

10 Claims. (Cl. 260—98)

This invention relates to a process for treating rosin, so as to modify various of the physical properties or characteristics thereof.

The present application is a continuation-in-part of my copending application Serial No. 386,371, filed April 1, 1941.

As mentioned in said copending application, rosin is believed to be an organic isocolloid, i. e., a colloidal system in which the dispersed phase and the dispersion medium are both of the same chemical composition though present in different physical states. The rosin may be either gum or wood rosin and may be derived from any suitable rosin producing trees, for instance, from trees of American, French, Spanish or Greek origin, yielding so-called American, French, Spanish or Greek rosin.

As disclosed in said copending application, modification of rosin may be brought about by treating the rosin with treating agents capable of modifying the physical properties thereof. Said copending application discloses a number of different treating agents.

In general, the process is carried out by heating the rosin to an elevated temperature and then dispersing the modifying agent in the rosin, the temperature preferably being maintained for an appreciable period of time after addition of the modifying agent, to bring about the desired degree of modification of properties. In this way, various characteristics of the rosin may be modified. For example, the drying property may be materially improved, in view of which the modified rosin is better suited for a number of uses, such as in varnishes, lacquers, or other coating compositions.

The treatment may also bring about other changes in characteristics, including consistency, melting point and acid value.

The modified products produced in accordance with the invention have uses other than the coating compositions. For instance, they may be employed to advantage in plastics.

The present application is particularly concerned with the employment of magnesium sulphate as a modifying agent for rosin. This agent is especially effective for liquefying or softening rosin. Moreover, its action is very rapid.

Magnesium sulphate is available in two forms and either form may be used. One form, containing water of crystallization, is somewhat less soluble than the anhydrous form. The water-containing form yields a very clear resin product, but sometimes a major portion of it may settle out in the form of a sediment. On the other hand, the anhydrous form disperses very readily in the rosin, although sometimes produces a milky dispersion, so that the rosin is not quite clear.

The process is carried out by heating the rosin to a temperature between about 250° C. and 350° C., preferably from about 270° C. to 290° C. The quantity of magnesium sulphate is from a minor fraction up to about 30%, preferably not more than about 10%. I have found up to about 5% to be sufficient and, in fact, highly effective for most purposes, especially if the anhydrous form is used.

The modifying agent may be added at the start of the process or after the rosin becomes liquid.

The treatment temperature is preferably maintained for a period of time after addition of the modifying agent, the time being dependent upon the degree of modification desired. The time may also vary somewhat depending upon the characteristics of the rosin undergoing treatment. In most cases the treatment should be continued for at least thirty minutes and usually for several hours.

Although for some purposes the reaction may be carried out in the presence of air and at atmospheric pressure, I prefer to carry out the reaction out of contact with the atmosphere, as by employing vacuum during the treatment period.

Rosin, in its natural state, is ordinarily quite hard and brittle and has an acid value, for example, in the neighborhood of 165.

Treatment of the character mentioned above is highly effective in softening rosin, and for most purposes I prefer to continue the treatment for a time and under conditions yielding a product of consistency ranging from about that of cold flow to about that of viscous oil. As is known, the so-called "cold flow" consistency is that consistency according to which the material will gradually flow at normal room temperatures, so that if a blob of the material is placed on a flat surface it will more or less gradually flatten out, often at a rate which is not observable with the eye.

The treatment described above partially decarboxylizes the rosin and lowers its acid value. For most purposes, the treatment is carried out to appreciably reduce the acid value from its original number (about 165), though preferably not below about 60. In instances where the acid value is brought down to a point close to the approximate lower limit just mentioned (a reduction of the order of about 100 points), it is to be expected that some variations in acid number may be encountered, for instance, even as much as 10 or 20 points. Thus, variations from about 40 to about 80 are considered as being in the neighborhood of the lower practical limit of acid value.

As series of comparative experiments was conducted, identified just below as Examples 1 to 7 inclusive. In each case the batch of rosin (1000 gms.) and the magnesium sulphate were heated together for 5 hours at a temperature of from 270° C. to 275° C., and under a vacuum of 100 mm. of mercury pressure, the heating being done in a 3 liter distilling flask.

This group of experiments illustrates comparative results secured from the two forms of magnesium sulphate (with and without water of crystallization), as used on two grades of rosin—one grade was N-wood (made by Hercules Powder Company), and the other W. W. wood rosin (made by Newport Industries).

Example 1

W. W. wood rosin as treated with 5% hydrated magnesium sulphate. The resulting product had an acid number of 69, and was a plastic material slightly orange in color. Sediment, probably unreacted magnesium sulphate, was filtered off.

Example 2

W. W. wood rosin was treated with 1% hydrated magnesium sulphate. The resulting product had an acid number of 97, and was a plastic material slightly orange in color, though somewhat less plastic than the product of Example 1. Again sediment was filtered off.

Example 3

N-wood rosin was treated with 5% hydrated magnesium sulphate. The resulting product had an acid number of 118.7, and was a clear plastic slightly orange in color. Sediment was filtered off.

Example 4

W. W. wood rosin was treated with 5% anhydrous magnesium sulphate. The resulting product had an acid number of 56, and was a cloudy liquid slightly greenish-yellow in color. Apparently, unreacted suspended magnesium sulphate caused the cloudiness.

Example 5

W. W. wood rosin was treated with 2.43% anhydrous magnesium sulphate (chemically equivalent to about 5% of the hydrated form). The resulting product had an acid number of 73, and was a cloudy liquid slightly greenish-yellow in color.

Example 6

W. W. wood rosin was treated with 1% anhydrous magnesium sulphate. The resulting product had an acid number of 94, and was a plastic cloudy material greenish-yellow in color.

Example 7

N-wood rosin was treated with 5% anhydrous magnesium sulphate. The resulting product had an acid number of 119.6, and was a greenish-yellow, cloudy plastic.

Comparison of the foregoing indicates that the hydrated magnesium sulphate was apparently insoluble in the rosins, at least to a considerable extent, and had to be filtered off in order to secure a homogeneous product. Use of 5% hydrated magnesium sulphate with W. W. wood rosin resulted in a plastic product. Use of 5% hydrated magnesium sulphate with N-wood rosin, and also use of 1% hydrated magnesium sulphate with W. W. wood rosin, gave plastic products, though somewhat less plastic than 5% of the hydrated material on W. W. wood rosin.

The rosins treated with anhydrous magnesium sulphate resulted in greenish-yellow, cloudy products, apparently because of the suspended magnesium sulphate. The examples using 5% and 2.43% anhydrous magnesium sulphate on W. W. wood rosin yielded liquid or plastic materials, whereas 1% anhydrous magnesium sulphate on the same rosin yielded a product which was plastic but less so than the higher percentages.

Comparison further shows that the acid number of the product decreases with increase in the quantity of magnesium sulphate employed, other conditions being equal.

Comparison further demonstrates that the W. W. wood rosin (made by Newport Industries) is more readily liquefied than the N-wood rosin (made by Hercules Powder Company).

In checking some of the results indicated above, an additional pair of comparative experiments was made, identified just below as Examples 8 and 9. The primary treatment conditions for these two experiments were the same as those outlined just ahead of the preceding examples.

Example 8

W. W. wood rosin was treated with 5% anhydrous magnesium sulphate. The resulting product had an acid number of 107, and was a greenish-yellow, cloudy plastic.

Example 9

N-wood rosin was treated with 5% anhydrous magnesium sulphate. The resulting product had an acid number of 108, and was a greenish-yellow, cloudy plastic.

In comparing the two examples just above, it was found that the products were very similar, with only very slight differences. For instance, the N-wood rosin apparently yielded a slightly more plastic material than the W. W. wood rosin.

The two experiments last considered, when compared with the result of various of the preceding examples, clearly indicate that even different batches of the same type rosin may react somewhat differently and produce slightly different products. This is true not only with respect to different batches of a given type of rosin, but also with respect to the same type of rosin derived from different sources, and still further with different rosins, such as gum rosin and wood rosin, of which there are a number of different grades so that, for instance, two different grades of wood rosin may manifest somewhat different characteristics when treated in accordance with the present invention.

Various of the differences between different rosins or batches thereof may result from varying methods of refining and/or by the presence in the rosins of traces of different refining agents. Differences in the botanical and/or geographical origin may also be responsible for variations in result.

In view of the foregoing, the temperature curve employed with any particular rosin is of importance if it is desired to secure substantially uniform properties such, for instance, as degree of plasticity. As a guide, it may be stated that, in general, increase in the treatment temperature accelerates liquefaction.

It may here be observd that under otherwise equal conditions liquefaction of the rosin is augmented or accelerated by increasing the quantity of modifying agent used, or by increasing the treatment temperature, or by increasing the length of heating time. With reference to the effect of increasing the quantity of magnesium sulphate, it is to be noted that increase in quantity up to a certain percentage (somewhat over 10%) serves to accelerate liquefaction, as mentioned just above. However, with increase of the percentage beyond that just indicated, the temperature is desirably increased in order to secure liquefaction.

As above mentioned, during liquefaction, partial decarboxylation of the rosin occurs, by forming terpene hydrocarbons. Therefore, especially when higher temperatures are utilized, the terpene hydrocarbons may partially distill over, if no precaution is taken. Moreover, when comparative tests are made it is of importance to provide for equal weight losses either by reducing the temperature after the reaction proceeds beyond the initial stages and/or by reducing the degree of vacuum (raising the pressure).

Example 10

100 parts of rosin were charged into the reaction vessel with 5 parts of magnesium sulphate containing water of crystallization. The charge occupied about one-third of the volume of the vessel. The temperature was raised to 260° C. and maintained for a period of 6 hours, during which the pressure was reduced to a vacuum of 28". A sample taken after the 6 hour period showed the product to be softened, non-resinous and somewhat greasy to the touch. The heating was thereafter continued for 2 hours. The cooled product was of a greenish-brown color, soft or semi-solid, and slightly sticky to the touch. On the following day the treatment conditions were again restored and maintained for 9½ hours, during which time no further change was observed.

Example 11

100 parts of rosin were treated with 5 parts of magnesium sulphate containing water of crystallization. The batch was heated to 270° C. under vacuum of about 17" to 19", the mixture being kept on temperature for 5 hours and then shut down and later re-started. 3½ hours after re-starting, another 5 parts of magnesium sulphate were added. The temperature was then raised to from about 290° C. to 300° C., whereupon the batch boiled gently, and after 1½ hours was poured out. The product was a dark brown viscous oil, with a green fluorescence.

Example 12

To 100 parts of hard American rosin were added 8 parts of magnesium sulphate containing water of crystallization and the mixture was heated in a partial vacuum for a few hours. Upon cooling, a viscous fluid modified resin was obtained.

Example 13

300 parts of rosin were heated together with 15 parts of hydrated magnesium sulphate. For a period of about 9 hours the temperature was maintained at about 270° C. to 280° C. under a vacuum of about 17" to 27". Following this, the temperature was raised to from about 290° C. to 300° C., being maintained at that temperature for about 7½ hours, and at the beginning of this second heating period an additional 15 parts of hydrated magnesium sulphate were added.

Apparently the reagent remained undissolved, at least in major part. The rosin darkened slightly, the final product being a soft-solid of golden brown color, with a green fluorescence.

Certain variations in procedure may be adopted.

For example, instead of using vacuum during the treatment period, other procedure may be adopted with a view to excluding the air from the reaction. The form of the reaction vessel employed may be such that gases evolved from the reaction will serve to effectively exclude air, without applying vacuum. Furthermore, certain gases, such as $SO_2$, $CO_2$ or nitrogen can be either bubbled through the reaction mass or employed as a blanket on the surface of the batch undergoing treatment. Expedients of this type not only serve to exclude the air from the reaction but may also be utilized for their supplemental effect on the material being treated, this subject being more fully considered in my copending application above referred to.

Moreover, as disclosed in the above mentioned copending application, still other variations in process may be employed for a number of different purposes, but it is not thought necessary to discuss these fully herein, since reference may be made to the copending application for that purpose. In passing, however, it is noted that additional treating agents, of a supplemental character, may also be present during the reaction, among which might be mentioned dissolution promoting agents of the type disclosed in my copending application.

In considering the starting material on which the process may be employed, it is first noted that the process brings about changes both of a colloidal and also of a chemical nature. It is important, however, to bear in mind that the process essentially involves a reaction with the rosin molecule. Therefore, while rosin itself, such as gum or wood rosins, represents perhaps the most important starting material to which the process is adaptable, it is noted that the process may be employed on rosin which has been pre-treated in various ways, or on mixed materials incorporating rosin, since the reaction will take place wherever the rosin molecule is present provided, of course, that the physical or chemical state or "environment" of the rosin molecule is not such as to prevent the reaction from taking place. Rosin modified maleic alkyds, rosin modified phenolics and rosin esters may be mentioned as examples of rosin-containing materials which may be treated by the process of the invention. Furthermore, mixtures of rosin and oils, such as drying or semi-drying oils, may also be treated.

The modified product of this invention may, if desired, be subject to other treatment, depending upon the use for which it is intended. Thus, for example, the modified products may be vulcanized with sulphur.

The modified resin products secured in accordance with the foregoing, may be vulcanized as such, or in solutions, such as varnish solutions (in the latter case, with sulphur chloride).

Further, they may be converted into emulsions and used for various purposes in that form.

Vulcanization, for certain purposes, is desirably carried out at temperatures between about 120° C. and 200° C., in which event sulphur or other sulphur-like vulcanizing agents may be used. For other purposes vulcanization may be effected at lower temperatures, for instance, at room temperature, in which event sulphur chloride, or similarly acting vulcanizing agents, may be used. In instances where the vulcanization is carried out in a varnish solution, the sulphur chloride treatment is especially practical.

The vulcanized liquefied resin products made in accordance with the invention have valuable properties for a number of purposes including the making of protective coatings, some of these vulcanized products being especially useful as plasticizers for coating compositions and plastics.

I claim:

1. The process of making a modified and softened rosin product from solid and brittle rosin, which process comprises incorporation in the rosin up to 30% of magnesium sulphate, and heating the mixture out of contact with the atmosphere at a temperature of from 250° C. to 350° C. until the resultant mixture, when cooled, is softened to a consistency between about that of cold flow and about that of viscous oil, the time of treatment further being sufficient to appreciably reduce the acid number of the rosin but not sufficient to lower said acid number to a value below about 60.

2. A process in accordance with claim 1 in which the temperature is maintained between about 270° C. and 290° C.

3. The process of making a modified and softened rosin product from solid and brittle rosin, which process comprises incorporation in the rosin up to 10% of magnesium sulphate, and heating the mixture out of contact with the atmosphere at a temperature of from 250° C. to 350° C. until the resultant mixture, when cooled, is softened to a consistency between about that of cold flow and about that of viscous oil, the time of treatment further being sufficient to appreciably reduce the acid number of the rosin but not sufficient to lower said acid number to a value below about 60.

4. A process in accordance with claim 1 in which the quantity of magnesium sulphate is not more than about 5%.

5. A process in accordance with claim 1 in which the temperature is maintained between about 270° C. and 290° C. and in which the quantity of magnesium sulphate is not more than about 10%.

6. A modified rosin product produced in accordance with the method of claim 3.

7. The process of treating solid and brittle rosin, which process comprises incorporation in the rosin up to 10% magnesium sulphate, and heating the mixture out of contact with the atmosphere at a temperature of from 250° C. to 350° C. until the resultant mixture, when cooled, is softened to a consistency between about that of cold flow and about that of viscous oil, the time of treatment further being sufficient to appreciably reduce the acid number of the rosin but not sufficient to lower said acid number to a value below about 60, and thereafter vulcanizing the softened rosin at a temperature between about 120° C. and 200° C.

8. The process of treating solid and brittle rosin, which process comprises incorporation in the rosin up to 10% magnesium sulphate, and heating the mixture out of contact with the atmosphere at a temperature of from 250% C. to 350° C. until the resultant mixture, when cooled, is softened to a consistency between about that of cold flow and about that of viscous oil, the time of treatment further being sufficient to appreciably reduce the acid number of the rosin but not sufficient to lower said acid number to a value below about 60, and thereafter vulcanizing the softened rosin with sulfur chloride.

9. A modified and vulcanized rosin product produced in accordance with the method of claim 7.

10. A modified and vulcanized rosin product produced in accordance with claim 8.

LÁSZLÓ AUER.